No. 862,062. PATENTED JULY 30, 1907.
L. DECKER.
WHIFFLETREE ATTACHMENT.
APPLICATION FILED JUNE 27, 1906.
2 SHEETS—SHEET 1.
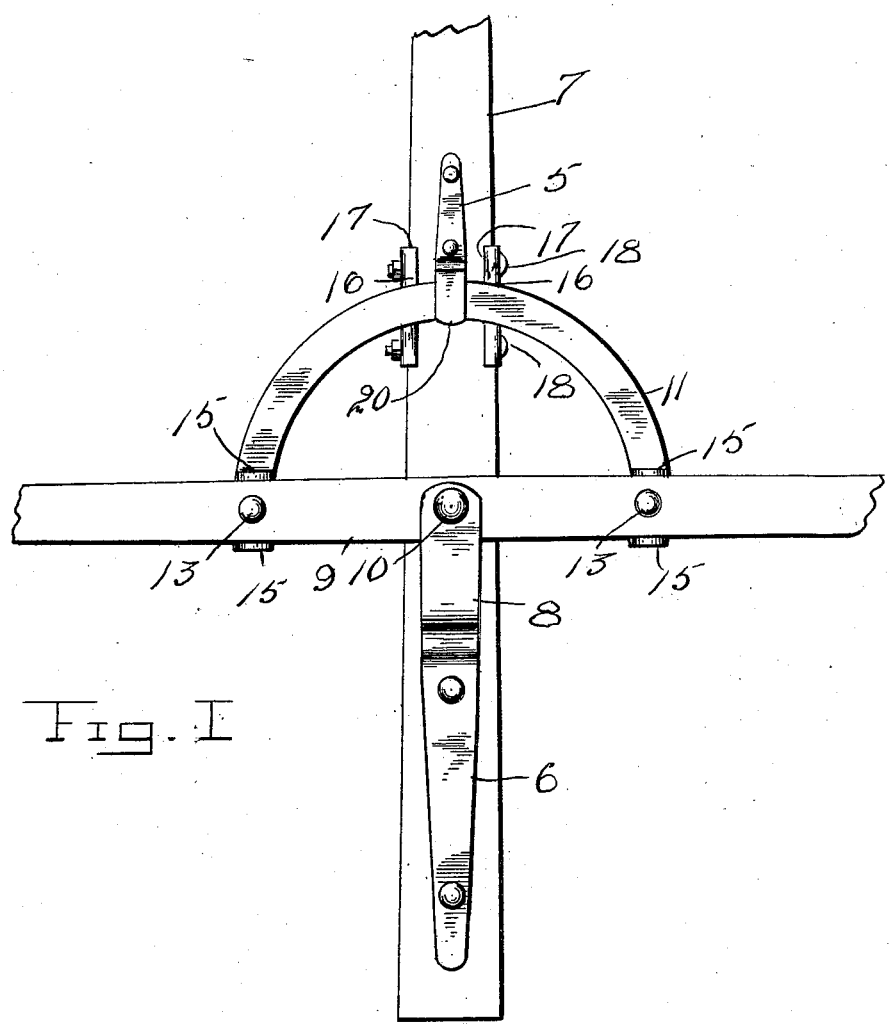
Fig. I
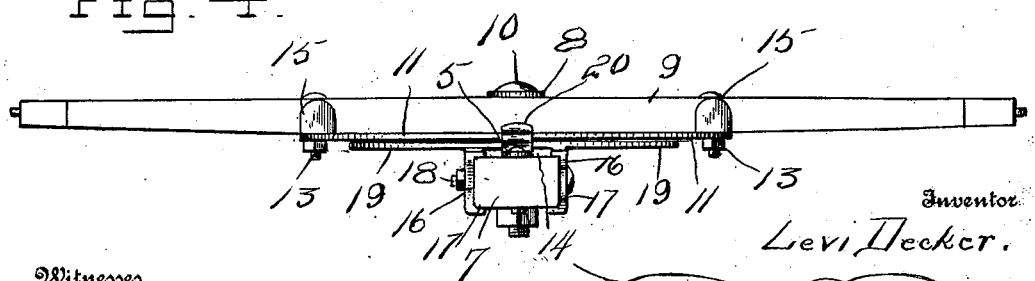
Fig. 4.
Witnesses
J. C. Simpson.
F. B. MacNab.
Inventor
Levi Decker.
By Chandler & Chandler
Attorneys

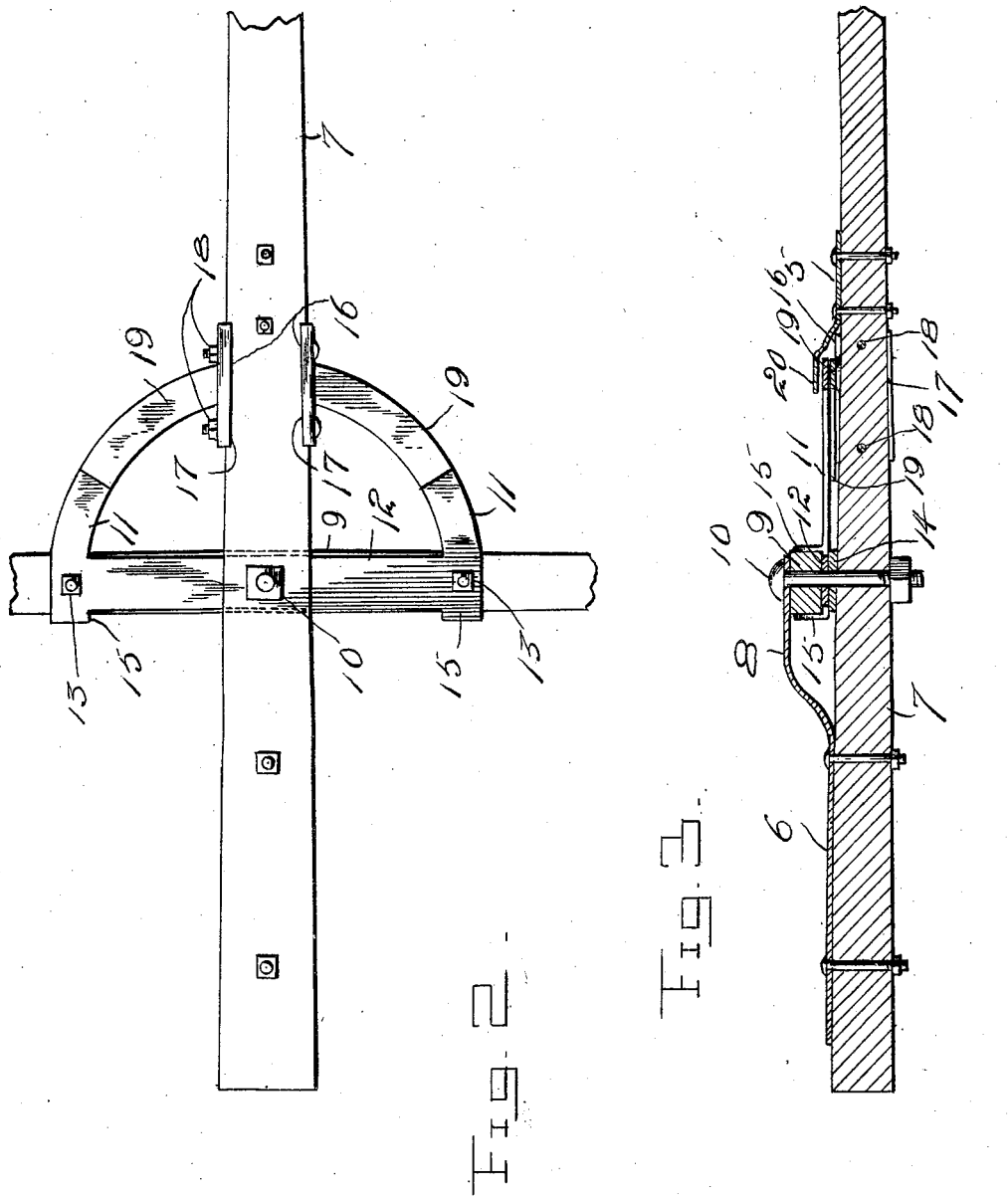

UNITED STATES PATENT OFFICE.

LEVI DECKER, OF STURGIS, SOUTH DAKOTA, ASSIGNOR TO WILLIAM A. McMICHAEL, OF STURGIS, SOUTH DAKOTA.

WHIFFLETREE ATTACHMENT.

No. 862,062.  Specification of Letters Patent.  Patented July 30, 1907.

Application filed June 27, 1906. Serial No. 323,605.

*To all whom it may concern:*

Be it known that I, LEVI DECKER, a citizen of the United States, residing at Sturgis, in the county of Meade, State of South Dakota, have invented certain new and useful Improvements in Whiffletree Attachments; and I do hereby declare the following to be a full, clear, and exact description of the invention, such as will enable others skilled in the art to which it appertains to make and use the same.

This invention has reference to whiffle-tree attachments, its object being the construction of a device adapted to be secured to the tongue of a vehicle, for holding the whiffle-tree level, and preventing it from loping down after use.

To this end the invention comprises a pair of oppositely disposed brackets secured to the vehicle tongue, and arranged longitudinally thereof, the rear bracket carrying the whiffle-tree, to the under face of which is attached a wheel segment, similar to the fifth wheel of a vehicle, the front end of the rear bracket being raised, to permit a swinging movement of the whiffle-tree upon its pivot bolt, the front bracket having its free end raised, in like manner, and extended over the wheel segment. The tongue is further provided with a sleeve arranged intermediate the brackets, the sleeve carrying a curved guide on which the wheel segment moves.

The invention will be more readily understood from the following detailed description, and from the accompanying drawings, in which, Figure 1 is a top plan view of the attachment. Fig. 2 is a bottom plan view thereof. Fig. 3 is a longitudinal vertical section taken axially through Fig. 1. Fig. 4 is a front end view of Fig. 1.

Like parts are designated by corresponding numerals in the several views.

Referring to the drawings, 5 and 6 designate respectively the front and rear brackets attached to the upper face of the vehicle tongue 7, and arranged longitudinally thereof. The rear bracket 6 has its front end elevated, as at 8, to form a seat in which the whiffle-tree 9 is carried, the whiffle-tree being retained in place therein between the bracket end and the tongue 7 by means of a headed bolt 10, acting as a pivot to permit a swinging movement of the whiffle-tree in either direction.

On the under face of the whiffle-tree is located a forwardly extending metallic wheel segment 11, similar to the fifth wheel of a vehicle, the ends of the segment being connected by a metallic strip 12, said segment and strip being secured to the whiffle-tree by bolts 13, the ends of which form shoulders or stops. To the upper face of tongue 7 is attached a plate 14, against which the under face of strip 12 bears, the bolt 10, above mentioned, passing through said strip and plate. The segment 11 is further connected with the whiffle-tree by means of a pair of jaws 15 formed integral with said segment, at each end thereof, said jaws bearing against opposite sides of the whiffle-tree, as shown.

Located upon the tongue slightly in advance of the whiffle-tree, is a sleeve 16, said sleeve comprising a pair of plates 17 arranged upon opposite sides of the tongue and bent to embrace the same, said plates being fastened to the tongue by bolts 18, or other preferred means. The upper edges of the plates are connected intermediate their ends by a rearwardly curved guide plate 19, formed concentric with segment 11, which latter bears against the upper face of the guide plate upon movement of the whiffle-tree in one direction or the other. The extent of said guide plate is, however, less than that of the segmet 11, so that upon an extended movement of the whiffle-tree in either direction, the depending head of the then forward bolt 13 will come into contact with the corresponding guide plate end, thus checking the movement of the whiffle-tree.

The front bracket 5 is, in like manner, attached to the upper face of pole 7, in advance of sleeve 16, said bracket being of less extent than bracket 6, and oppositely disposed with respect thereto. The free end 20 of the front bracket projects over and across guide plate 19 and segment 11, thus assisting in preventing any forward movement of the whiffle-tree, and at the same time holding the segment in place upon the guide plate.

It will be readily understood from the foregoing that the segment 11, which extends on both sides of the tongue, and bears upon the guide plate 19, will serve, in connection with the latter, to hold the whiffle-tree level and prevent it from loping down after use, thus supporting it in place upon the vehicle tongue, and thus, to a great extent, obviating the straining and splitting of the tongue due to such loping or displacement.

It is also intended that the device heretofore referred to, with slight changes and alterations and a rearward extension, shall be attached to the ends of the whiffle-tree and to the middle of the singletrees with suitable fastenings, bolts, screws or clamps. The intention of this further use of the invention is to keep the singletree from loping down at the ends, making the doubletree consisting of the whiffle-tree and two single-trees, when all are complete and properly put together with this device, maintain a level position after they become worn, and to prevent them from loping and wabbling.

What is claimed, is:—

1. A device of the kind described comprising a bracket secured to the tongue of a vehicle; a whiffle-tree pivotally mounted in said bracket; a curved extension secured to the under face of said whiffle-tree; a sleeve secured to said tongue; a guide plate secured to said sleeve, and along which said extension is adapted to travel, said guide plate and extension being adapted to hold said whiffle-tree level; and a member secured at one end to said tongue and extending transversely across said extension, to hold the latter in contact with said guide plate.

2. A device of the kind described comprising a bracket secured to the tongue of a vehicle; a whiffle-tree pivotally mounted in said bracket; a curved forward extension secured to the under face of said whiffle-tree; a sleeve attached to said tongue in advance of said extension; a rearwardly extended guide plate mounted upon said sleeve, and along which said first mentioned extension is adapted to travel, said guide plate and extension being adapted to hold said whiffle-tree level; and a member secured at its forward end to said tongue and extending rearwardly transversely across said extension to hold the latter in contact with said guide plate.

3. A device of the kind described comprising a bracket secured to the tongue of a vehicle; a whiffle-tree pivotally mounted in said bracket; a segmental extension secured to the under face of said whiffle-tree; a sleeve attached to said tongue in advance of said extension; a rearwardly extending segmental guide plate attached to said sleeve and formed concentric with said segmental extension, said segmental extension being adapted to travel upon said guide plate, and serving, with said guide plate, to hold said whiffle-tree level; and a bracket secured at one end to said tongue in advance of said sleeve, said last mentioned bracket being oppositely disposed with respect to said first mentioned bracket, and having its free end projecting across said segmental extension and said guide plate, to hold the same in contact with each other.

4. A device of the kind described comprising in combination a bracket secured at one end to the tongue of a vehicle; a whiffle-tree pivotally mounted in the free end of said bracket; a segment secured to the under face of said whiffle-tree and extending forwardly with respect thereto; a pair of jaws formed on each end of said segment, said jaws bearing against opposite sides of said whiffle-tree; a sleeve attached to said tongue in advance of said segment; a rearwardly extending segmental guide plate secured to said sleeve, and formed concentric with said first mentioned segment, said segment being adapted to travel upon said guide plate, and serving therewith to hold said whiffle-tree level; and a bracket secured at one end to said tongue in advance of said sleeve, said last mentioned bracket being oppositely disposed with respect to said first mentioned bracket, and having its free end projecting across said segmental extension and said guide plate, to hold the same in contact with each other.

In testimony whereof, I affix my signature, in presence of two witnesses.

LEVI DECKER.

Witnesses:
 FRANK SMITH,
 FRANK BURROUGHS.